Dec. 24, 1940.   R. E. LEE   2,226,295
FISHING POLE TIP
Filed April 16, 1940
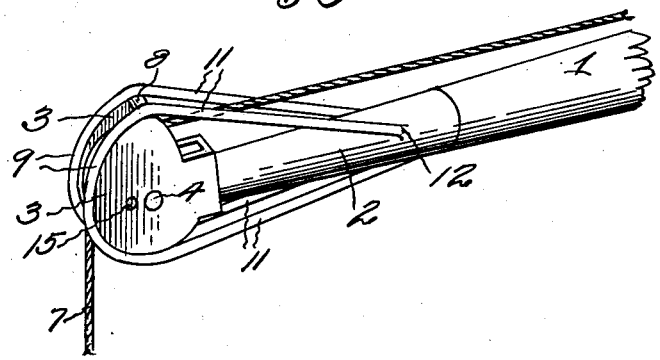
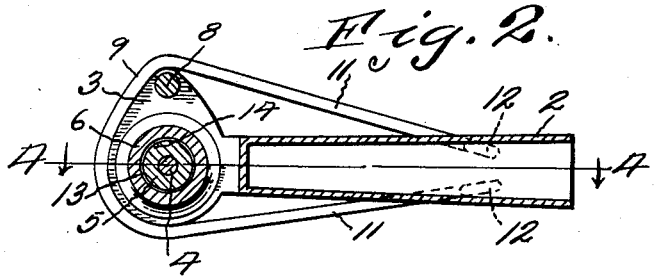
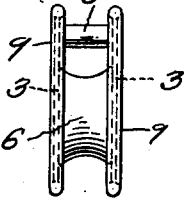
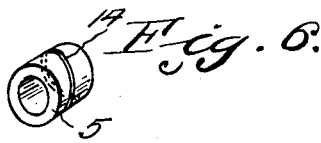
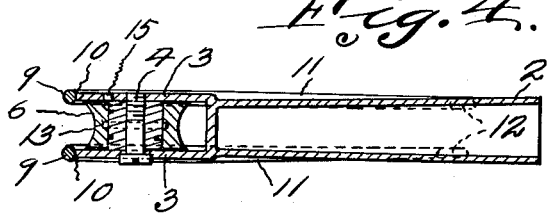
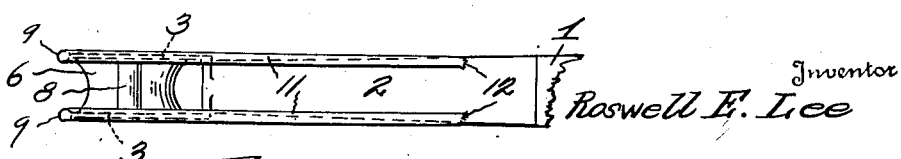
Inventor
Roswell E. Lee
By Philip A. H. Terrell
Atty.

Patented Dec. 24, 1940

2,226,295

UNITED STATES PATENT OFFICE 2,226,295

FISHING POLE TIP

Roswell Edward Lee, Miami, Fla., assignor to Lee's Tackle Manufacturing Corporation, Miami, Fla.

Application April 16, 1940, Serial No. 329,980

2 Claims. (Cl. 43—24)

The invention relates to fishing pole tips and has for its object to provide a device of this character comprising a bifurcated head having a grooved roller in the bifurcation, the sides of said bifurcation forming cheeks of larger areas than the rollers, and provided with looped members extending around their marginal edges to the outside of the checks and converging inwardly and anchored to the socket of the head to the rear of the roller.

A further object is to form the loops from material, round in cross section and of greater diameter than the thickness of the cheeks of the bifurcation to prevent the fishing line from contacting sharp edges no matter at what angle the lead end of the line may be positioned while landing a fish.

A further object is to dispose a stationary bushing between the cheeks and to rotatably mount the grooved roller on the bushing and to provide said bushing and roller with cooperating lubricant grooves for lubricating the bearing surfaces therebetween at all times.

A further object is to provide a fishing pole tip, comprising a pole receiving socket terminating in a roller receiving bifurcation having side cheeks and line guiding loops carried by the outer edges of the cheeks and extending rearwardly in converging relation and anchored to the socket adjacent the rear end of the socket.

A further object is to provide a circumferential lubricant channel in the inner periphery of the roller and the outer periphery of the bushing with a spiral lubricant groove for distributing lubricant over the engaging surfaces of the bushing and roller as the roller rotates.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the tip showing the same on a pole end.

Figure 2 is a vertical longitudinal sectional view through the tip.

Figure 3 is a front elevation of the tip.

Figure 4 is a horizontal sectional view taken on line 4—4 of Figure 2.

Figure 5 is a top plan view of the tip.

Figure 6 is a perspective view of the bushing.

Referring to the drawing, the numeral 1 designates the outer end of a conventional form of fishing pole and 2 the socket of the tip in which the fishing pole end is secured in any suitable manner. The outer end of the socket 2 is bifurcated to form spaced roller cheeks 3 in parallel relation. Rigidly held between the cheeks 3, by means of a screw 4, is a nonrotatable bushing 5, preferably made of brass, and rotatably mounted on the bushing is a grooved pulley 6 and over which the fishing line 7 extends, as shown in Figure 1, and beneath the round stud 8 which connects the upper end of the cheeks 3 together. It will be noted by providing a round stud that danger of cutting or chafing the line is obviated. The cheeks 3 are braced by means of the looped line guides 9 which are soldered or otherwise secured to the outer marginal edges of the cheeks at 10. The line guides are preferably round in cross section and of greater diameter than the thickness of the cheeks 3, so that as the line is pulled from side to side while landing a fish it will not come into engagement with sharp edges. The line guides 9 are provided with rearwardly converging arms 11, anchored by soldering or welding at 12 to the socket 2 adjacent the rear end of the socket, therefore it will be seen that the cheeks are not only thoroughly braced, but at the same time the arms 11 will act as line guides without damage to the line, and the upper guides will properly guide the line onto the roller should slack develop in the line to the rear of the roller.

The inner periphery of the roller 6 is provided with an annular lubricant collecting groove 13 and the outer periphery of the stationary bushing 5 is provided with a spiral lubricant distributing groove 14, therefore it will be seen that the engaging surfaces of the roller and bushing will be thoroughly lubricated at all times and the grooved roller will rotate freely under all kinds of weather conditions. Lubricant is supplied to the bearing surfaces and grooves through the oil supply aperture 15 in one of the cheeks 3. It will also be noted that the rounded side edges of the roller 6 are within the lines of the line guides 9 as clearly shown in Figure 4 and that said edges are slightly rounded, hence danger of cutting the line at this point is obviated. The tip is preferably made of a non-corrosive material or a chromium plated material and the pulley preferably of nickle silver, however applicants do not limit themselves to any particular kind of material.

The invention having been set forth what is claimed as new and useful is:

1. The combination with a fishing pole tip having spaced roller cheeks, a line roller between said cheeks, and a pole receiving socket carried by said cheeks, of line guides and cheek braces arching the outer sides of said cheeks and extending rearwardly in converging relation and anchored to the socket to the rear of the cheeks.

2. The combination with a fishing pole tip having a bifurcation therein, a line roller within the bifurcation, a stationary bushing within the bifurcation and on which the roller is rotatably mounted, of means for lubricating said roller, said means comprising an annular channel in the inner periphery of the roller around the bushing, the outer periphery of said bushing having a spirally arranged lubricant channel therein.

ROSWELL EDWARD LEE.